Feb. 9, 1954 D. F. ILLIAN 2,668,589
CYCLIC CONTROL PROGRAM SYSTEM
Original Filed May 7, 1949 2 Sheets-Sheet 1
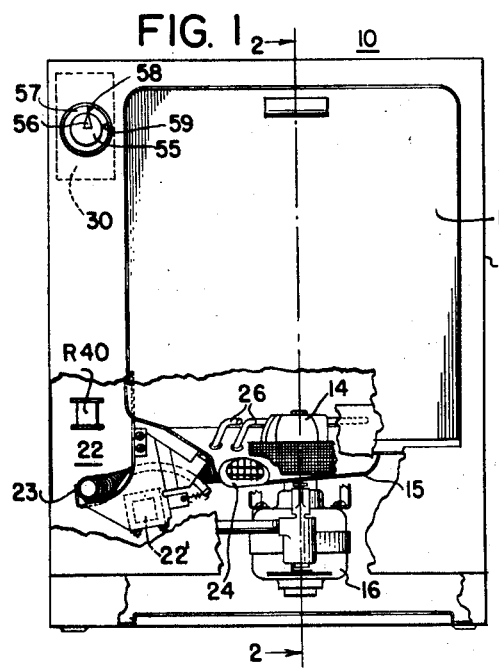
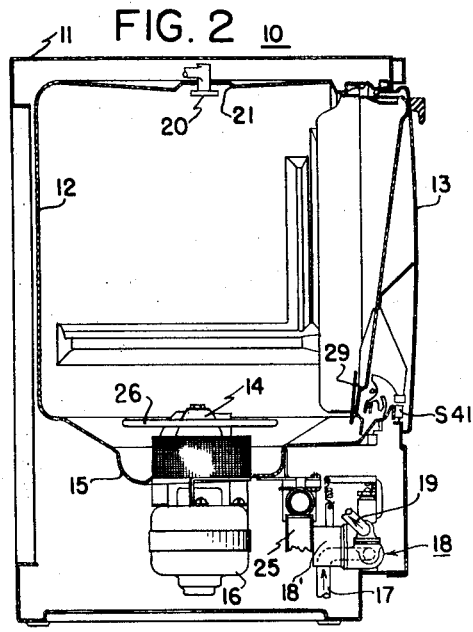
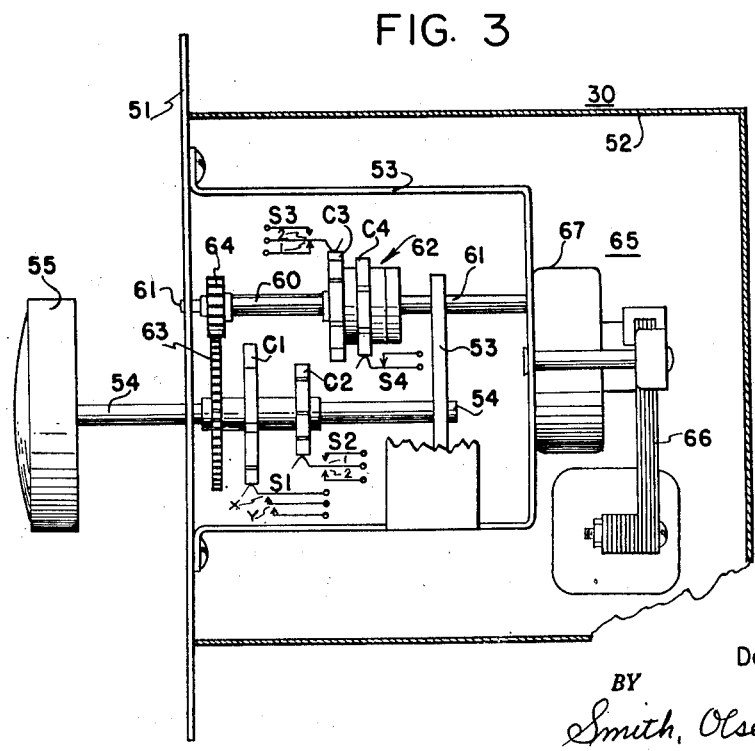
INVENTOR.
Douglas F. Illian
BY
Smith, Olsen + Baird
ATTYS

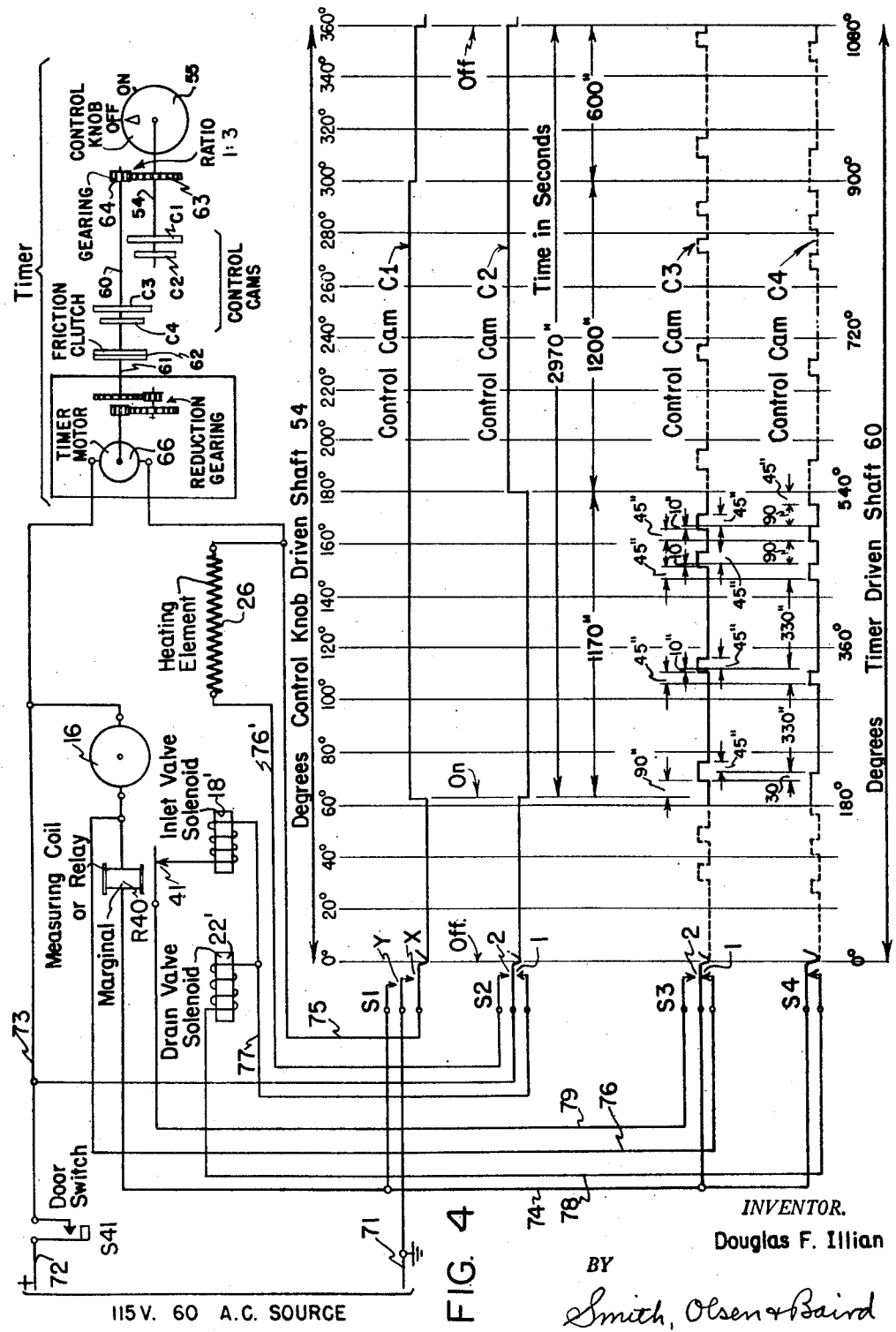

Patented Feb. 9, 1954

2,668,589

UNITED STATES PATENT OFFICE 2,668,589

CYCLIC CONTROL PROGRAM SYSTEM

Douglas F. Illian, Oak Park, Ill., assignor to General Electric Company, a corporation of New York Original application May 7, 1949, Serial No. 91,906, now Patent No. 2,624,352, dated January 6, 1953. Divided and this application September 22, 1951, Serial No. 247,866

6 Claims. (Cl. 161—1)

The present invention relates to cyclic control program systems and more particularly to selecting switches for such systems. This application is a division of the copending application of Douglas F. Illian, Serial No. 91,906, filed May 7, 1949, now Patent No. 2,624,352.

In the Illian application mentioned there is disclosed an electric control system for dishwashing apparatus of the character of that disclosed in the copending application of Edgar S. Stoddard, Serial No. 86,291, filed April 8, 1949. This control system governs the operation of the apparatus to perform automatically and in predetermined sequence given steps including spraying, washing, rinsing and drying of the dishes and other utensils contained in the apparatus. Also this apparatus comprises a cabinet housing a vertically disposed vat including a front opening and a door for closing the front opening, the door being mounted for movements between a substantially vertical closed position and a substantially horizontal open position. Further this apparatus comprises rack structure for supporting the dishes and other utensils that is movable over the door in its open position into and out of the vat through the front opening.

It is the general object of the present invention to provide a program selecting system that may be readily incorporated into a dishwasher, clothes washer, or other apparatus, for the purpose of controlling the cycle of operation thereof.

Another object of the invention is to provide an improved cyclic control system incorporating an electro-responsive time-governed circuit controller.

A further object of the invention is to provide an improved program selecting switch of the combined manual and timer controlled type.

Further features of the invention pertain to the particular arrangement of the elements of the cyclic control program system and of the circuit controller incorporated therein, whereby the above-outlined and additional operating features thereof are attained.

The invention, both as to its organization and method of operation, together with further objects and advantages thereof, will best be understood by reference to the following specification taken in connection with the accompanying drawings, in which Figure 1 is a front eleva- tional view, partly broken away, of dishwashing apparatus incorporating a cyclic control program system embodying the present invention; Fig. 2 is a vertical sectional view of the dishwashing apparatus, taken in the direction of the arrows along the line 2—2 in Fig. 1; Fig. 3 is an enlarged fragmentary sectional view of the circuit controller incorporated in the control circuit of the dishwashing apparatus shown in Figs. 1 and 2, certain of the elements of the circuit controller being diagrammatically illustrated; and Fig. 4 is an electric diagram of the circuit controller and the circuit control arrangement incorporated in the dishwashing apparatus shown in Figs. 1 and 2.

Referring now to Figs. 1 and 2 of the drawings, there is generally illustrated dishwashing apparatus 10 of the character of that disclosed in the previously mentioned Stoddard application and incorporating a cyclic control circuit embodying the features of the present invention. The dishwashing apparatus 10 is of the gasketless-door front-opening type including a cabinet 11 housing a substantially vertically disposed vat 12, the cabinet 11 and the vat 12 having substantially aligned front openings that are closed by a front door 13. The front door 13 is pivotally mounted adjacent to the lower edge thereof within the lower portion of the vat 12 and is movable between a substantially vertical closed position and a substantially horizontal open position. Also the dishwashing apparatus 10 comprises movable rack structure, not shown, that is adapted to support dishes and other utensils within the vat 12 for washing purposes, the rack structure being movable into and out of the vat 12 through the front openings when the door 13 occupies its open position. An impeller 14 is arranged within a sump 15 formed in the lower portion of the vat 12 and is rotated by an associated electric operating motor 16 for the purpose of producing a washing action within the vat 12 when the door 13 occupies its closed position and washing liquid is contained in the sump 15.

For the purpose of supplying washing liquid to the vat 12 there is provided an inlet conduit 17 connected to a suitable source of washing liquid such, for example, as a hot water tank. The inlet conduit 17 communicates with the inlet port of an inlet valve 18 of the solenoid controlled type; and the outlet port of the inlet valve 18 communicates with a conduit 19 that is connected to a spraying device 20 arranged in a depression 21 formed substantially centrally within the top wall of the vat 12. The inlet valve 18 is of the fast-opening, slow-closing type, being governed by an associated dashpot so as to prevent water hammer in the plumbing communicating with the inlet conduit 17. The inlet valve 18 is normally biased to its closed position, and when the solenoid 18' thereof is energized it is operated into its open position in order that washing liquid may be supplied from the inlet conduit 17 to the spraying device 20, whereby the washing liquid is sprayed downwardly from the top of the vat 12 through the rack structure, not shown, and accumulates in the sump 15. Subsequently, when the solenoid 18' of the inlet valve 18 is de-energized it moves slowly from its open position to its closed position in order to cut off the supply of washing liquid from the inlet conduit 17 to the spraying device 20.

For the purpose of controlling the retention of washing liquid in the sump 15, there is provided a drain mechanism or valve 22 of the solenoid controlled type. The drain valve 22 comprises a flexible conduit 23, one end of which communicates with a drain fixture 24 provided in the lower portion of the sump 15, and the other end of which communicates with a drain conduit 25 that is connected via a trap, or the like, not shown, to drain plumbing, not shown. The flexible conduit 23 is normally biased into its lower position in order to place the interior of the sump 15 into draining communication with the drain conduit 25 so that any washing liquid accumulating in the sump 15 runs through the flexible conduit 23 into the drain conduit 25; and when the solenoid 22' thereof is energized the flexible conduit 23 is elevated into its upper position in order to cut off the draining communication between the interior of the sump 15 and the drain conduit 25 so that washing liquid may be retained in the sump 15. Subsequently, when the solenoid 22' is de-energized the drain valve 22 is returned to its draining position in order to effect draining of the washing liquid from the sump 15.

For the purpose of effecting drying of the dishes and other utensils supported by the rack structure, not shown, within the vat 12, there is provided a heating unit or element 26 that is preferably of the sheathed resistance conductor type. The heating element 26 is disposed in the lower portion of the vat 12 and in surrounding relation with respect to the impeller 14 so that air blown by the blades of the rotating impeller 14 contacts the heating element 26 and then moves upwardly into the vat 12 through the dishes and other utensils supported by the rack structure, not shown.

The lower portion of the door 13 carries a detergent cup 29 opening toward the interior of the vat 12 and adapted to receive a charge of detergent. Preferably, the detergent that is employed is of the type sold under the trade name "Calgonite" that comprises about 40 per cent sodium hexametaphosphate and 60 per cent sodium metasilicate.

For the purpose of effecting coordinated operation of the operating motor 16, the inlet valve 18, the drain valve 22 and the heating element 26, so that a washing cycle, including predetermined spraying, washing, rinsing and drying steps, is carried out, a circuit controller 30 is incorporated in the dishwashing apparatus 10, the circuit controller 30 being arranged in the upper left-hand front portion of the dishwashing apparatus 10 and disposed between the adjacent left-hand side wall of the cabinet 11 and the adjacent left-hand side wall of the vat 12. Of course, the circuit controller 30 is arranged exteriorly of the vat 12 and is appropriately wired in a circuit control network, including the operating motor 16, the solenoids 18' and 22', the heating element 26, a measuring coil or relay R40 and a door switch S41. The measuring coil R40 is suitably supported within the cabinet 11 exteriorly of the vat 12 and is of the marginal type, being provided with an armature, not shown, controlling a pair of contacts 41. As indicated in Fig. 2, the door switch S41 may be carried adjacent to the front lower portion of the upstanding ledge disposed adjacent to the front opening provided into the vat 12 and in operative relation with respect to the door 13. More particularly, when the door 13 is respectively moved to its closed and opened positions, the door switch S41 is respectively operated to its closed and opened positions. Finally, the circuit network comprises a source of current supply that may be of 115 volts 60 cycle A. C.

As best shown in Figs. 1 and 3 the circuit control 30 is of the combination manual and timer controlled type and comprises a front supporting plate 51 that is carried by the cabinet 11 rearwardly of the extreme front wall thereof. The front plate 51 is provided with a casing 52 detachably secured thereto, as well as a supporting bracket 53. A first rotatable shaft 54 is suitably journalled within the front plate 51 and in the bracket 53 and projects forwardly through a hole provided in the front wall of the cabinet 11 to the exterior. A manual control knob 55 is removably secured to the extreme front end of the shaft 54 and carries a pointer 56 that cooperates with a trim ring 57 secured upon the outer surface of the front wall of the cabinet 11. The trim ring 57 carries indicia cooperating with the pointer 56 and including the "off" index 58 and the "on" index 59. Also the circuit controller 30 comprises a second rotatable shaft 60 and a stub shaft 61. The stub shaft 61 is suitably journalled in the front plate 51 and in the bracket 53, and the second shaft 60 constitutes a sleeve journalled on the stub shaft 61. The shafts 60 and 61 are disposed above the shaft 54 and carry a friction clutch indicated at 62. The details of the friction clutch 62 are not shown but the adjacent face plates thereof are urged into frictional engagement with each other and are respectively rigidly secured to the shafts 60 and 61 for a purpose more fully explained hereinafter. The shafts 54 and 60 are interconnected by speed-change gearing including two meshed pinions 63 and 64 respectively rigidly secured thereto. The pinion 63 secured to the shaft 54 has precisely N times as many teeth as the pinion 64 secured to the shaft 60, where N equals to 3. Accordingly, the gearing effects a 1:3 speed ratio between the shafts 54 and 60; whereby one revolution of the shaft 54 effects three revolutions of the shaft 60 and one revolution of the shaft 60 effects ⅓ revolution of the shaft 54. Further, the circuit controller 30 comprises a timer motor unit 65 of the electro-responsive type that is carried by the bracket 53. The timer motor unit 65 may be of the "Telechron" type including a motor proper 66 and a gear box 67 housing the usual speed reduction gearing, the speed reduction gearing housed within the gear box 67 interconnecting the stub shaft 61 and the motor proper 66. The gearing within the gear box 67 is so constructed and arranged that when the motor proper 66 is energized from the 115 volts 60 cycle A. C. source the stub shaft 61 is rotated at a speed of precisely three revolutions per hour.

In view of the foregoing description of the circuit controller 30, it will be understood that the shaft 54 may be manually rotated by the manual control knob 55 in order to effect rotation of the shaft 60 through the gearing 63—64; however, this rotation of the shaft 60 is not imparted to the stub shaft 61 directly connected by the gearing in the gear box 67 to the motor proper 66, the friction clutch 62 accommodating relative rotation between the shaft 60 and the stub shaft 61 by slipping action. On the other hand, when the motor proper 66 is energized, the stub shaft 61 is rotated at three revolutions per hour through the gearing in the gear box 67 and drives the shaft 60 through the friction clutch 62 at the speed noted. The consequent rotation of the shaft 60 at three revolutions per hour effects rotation of the shaft 54 at one revolution per hour by virtue of the gearing 64—63 interposed therebetween. Accordingly, operation of the motor proper 66 is normally effective to rotate the shaft 60 at three revolutions per hour in the counterclockwise direction and to rotate the shaft 54 at one revolution per hour in the clockwise direction as viewed in Fig. 1. The shaft 54 comprises an "off" position and an "on" position respectively corresponding to the "off" and "on" indicia 58 and 59 respectively carried by the trim ring 57 and cooperating with the pointer 56 provided on the manual control knob 55. In the arrangement the "on" index 59 is disposed slightly more than 60 degrees in the clockwise direction from the "off" index 58 so that when the manual control knob 55 is grasped and rotated in the clockwise direction through this angle slightly greater than 60 degrees, the pointer 56 is moved from its normal position cooperating with the "off" index 58 into an advanced position cooperating with the "on" index 59. As explained more fully hereinafter, the motor proper 66 is energized at this time, whereby the stub shaft 61 and the shaft 60 are driven at the previously noted speed in the counterclockwise direction effecting further rotation of the shaft 54 in the clockwise direction. Specifically, the shaft 54 is further rotated at the speed of one revolution per hour from its "on" control position in the clockwise direction back into its "off" control position, whereby the pointer 56 carried by the manual control knob 55 again cooperates with the "off" index 58 provided on the trim ring 56. Thus, it will be understood that after the shaft 54 is rotated from its "off" control position into its "on" control position in the clockwise direction by the manual control knob 55 it is automatically rotated further in the clockwise direction back into its "off" control position by the motor proper 66 in a time interval slightly less than 50 minutes.

Of course, the shaft 54 comprises a plurality of control positions angularly disposed between its "on" control position and its "off" control position, through which the shaft 54 proceeds sequentially as it is rotated in the clockwise direction. Also the shaft 60 comprises a plurality of angularly disposed control positions through which it proceeds three times incident to one complete revolution of the shaft 54 as a consequence of the gearing 63—64 interconnecting the shafts 54 and 60. Two insulating cams respectively indicated at C1 and C2 are rigidly secured to the shaft 54 and respectively cooperate with two sets of switch springs diagrammatically illustrated at S1 and S2. Similarly, two insulating cams respectively indicated at C3 and C4 are rigidly secured to the shaft 60 and respectively cooperate with two sets of switch springs diagrammatically illustrated at S3 and S4. The set of switch springs S1 cooperating with the cam C1 comprises three individual springs that are adapted selectively to complete X and Y contacts in the various control positions of the shaft 54 as explained more fully hereinafter. Similarly, the set of switch springs S2 cooperating with the cam C2 comprises three individual springs that are adapted selectively to complete contacts 1 and 2 in the various control positions of the shaft 54 as explained more fully hereinafter. Similarly, the set of switch springs S3 cooperating with the cam C3 comprises three individual springs that are adapted selectively to complete contacts 1 and 2 in the various control positions of the shaft 60 as explained more fully hereinafter. Finally, the set of switch springs S4 cooperating with the cam C4 comprises two individual springs that are adapted selectively to complete associated contacts in the various control positions of the shaft 60 as explained more fully hereinafter. In the arrangement the sets of switch springs S1 and S2 are of the three-position type, while the sets of switch springs S3 and S4 are of the two-position type.

The connection and arrangement of the control network for the various elements of the dishwashing apparatus 10 will best be understood by reference to Fig. 4, wherein there is illustrated diagrammatically both the elements mentioned, as well as a time-sequence operating chart therefor indicating the coordinate controls exercised by the cams C1 to C4, inclusive, upon the associated sets of switch springs S1 to S4, inclusive. In the circuit network it is assumed that the negative line conductor 71 of the source of current supply is connected to ground potential and that the positive line conductor 72 of the source of current supply is insulated from ground potential. The positive line conductor 72 of the source of current supply is connected directly to one terminal of the door switch S41; and the other terminal of the door switch S41 is connected to a control conductor 73. One terminal of the operating motor 16 is connected to the control conductor 73; and the other terminal of the operating motor 16 is connected commonly to a control conductor 76 and to one terminal of the measuring coil R40, the other terminal of the measuring coil R40 being connected to a control conductor 74. One terminal of the timer motor 66 is connected to the control conductor 73; and the other terminal of the timer motor 66 is connected commonly to one terminal of the heating element 26 and to a control conductor 75, the other terminal of the heating element 26 being connected to a control conductor 76. A control conductor 77 is commonly connected to terminals of the respective solenoids 18' and 22'; the other terminal of the solenoid 18' being connected to one of the contacts 41 of the measuring coil R40, the other terminal of the solenoid 22' being connected to a control conductor 78, and the other of the contacts 41 of the measuring coil R40 being connected to a control conductor 79. In the set of switch springs S1, the uppermost spring is connected to the control conductor 74, the intermediate spring is connected to the negative line conductor 71, and the lowermost spring is connected to the control conductor 75. In the set of switch springs S2, the uppermost spring is connected to the control conductor 76, the intermediate spring is connected to the control conductor 73, and the lowermost spring is connected to the control conductor 77. In the set of switch springs S3, the uppermost spring is connected to the control conductor 79, the intermediate spring is connected to the control conductor 74, and the lowermost spring is connected to the control conductor 76. In the set of switch springs S4 the upper and lower springs are respectively connected to the control conductors 74 and 78.

When the dishwashing apparatus 10 is at rest the manual control knob 55 occupies the position illustrated in Fig. 1, whereby the pointer 56 carried by the manual control knob 55 registers with the legend "off" carried by the trim ring 57 and the shaft 54 occupies its normal "off" position and the shaft 60 occupies its normal position. At this time the cam C1 governs the set of switch springs S1 to effect opening of the contacts X and Y; while the cam C2 governs the set of switch springs S2 to effect opening of the contacts 1 and 2. Similarly, the cam C3 governs the set of switch springs S3 to effect respective closing and opening of the contacts 1 and 2; while the cam C4 governs the set of switch springs S4 to effect closing of the associated contacts.

Considering now the cycle of operation of the dishwashing apparatus 10, the person loads the dishes and other utensils into the rack structure, not shown, and moves the rack structure into the vat 12, and then places a charge of detergent into the detergent cup 29. The person then moves the door 13 from its open position into its closed position effecting closure of the door switch S41, and then rotates the manual control knob 55 in the clockwise direction from its "off" position into its "on" position. When the manual control knob 55 is thus rotated in the clockwise direction the shaft 54 is rotated in the clockwise direction and the shaft 60 is rotated in the counterclockwise direction. As indicated diagrammatically in Fig. 4, all of the control cams C1 to C4, inclusive, are moved toward the left with respect to the associated sets of switch springs S1 to S4, respectively. During this preliminary rotation of the shaft 54 in the clockwise direction from its "off" position into its "on" position, the control cams C3 and C4 respectively operate the sets of switch springs S3 and S4; however, without effect, since the set of switch springs S2 retains both of the contacts 1 and 2 thereof in their open positions; this ineffective operation of the sets of switch springs S3 and S4 by the respectively associated cams C3 and C4 being brought about by virtue of the fact that the shaft 60 is rotated slightly greater than 180 degrees while the shaft 54 is rotated slightly greater than 60 degrees. The ineffective controls of the cams C3 and C4 with respect to the sets of switch springs S3 and S4, respectively, are indicated in dotted lines on the left-hand side and on the right-hand side of the effective control thereof indicated in solid lines, as explained more fully hereinafter. When the shaft 54 is rotated into its "on" position, slightly over 60 degrees in the clockwise direction from its "off" position, the cams C1 and C2 respectively operate the sets of switch springs S1 and S2. Specifically, at this time, in the set of switch springs S1, the lowermost spring engages the highest portion of the cam C1 effecting closure of the contacts X and Y; and in the set of switch springs S2, the intermediate spring engages the lowest portion of the cam C2 effecting closure of the contacts 1. Also, at this time, in the set of switch springs S3, the intermediate spring engages the low portion of the cam C3 effecting respective closure and opening of the contacts 1 and 2; and in the set of switch springs S4, the upper spring engages the high portion of the cam C4 effecting opening of the associated contacts. In the set of switch springs S1, when the contacts Y are thus closed, a direct circuit, including the control conductor 74, the contacts 1 of the set of switch springs S3, the control conductor 76 and the door switch S41, is completed across the line conductors 71 and 72 for initiating operation of the operating motor 16. Also, in the set of switch springs S1, when the contacts X are thus closed, a circuit, including the control conductors 75 and 73 and the door switch S41, is completed across the line conductors 71 and 72 for initiating operation of the timer motor 66. Upon operating, the operating motor 16 rotates the impeller 14 in the counterclockwise direction as viewed from the top of the vat 12. Upon operating, the timer motor 66 rotates, through the gearing, the gear box 67, the stub shaft 61 in the counterclockwise direction, whereby the shaft 60 is rotated in the counterclockwise direction through the friction clutch 62, effecting continued rotation of the shaft 54 in the clockwise direction from its "on" position by virtue of the gearing 64—63. As previously noted the shaft 60 is rotated at a speed of three revolutions per hour while the shaft 54 is rotated at a speed of one revolution per hour; whereby during the next succeeding 1170 seconds the cams C3 and C4 bring about effective selective operations of the respective sets of switch springs S3 and S4, as explained more fully below.

After an elapsed time interval of approximately 90 seconds, in the set of switch springs S3, the intermediate spring engages the high portion of the cam C3 effecting opening of the contacts 1 and closing of the contacts 2. When the contacts 1 in the set of switch springs S3 are thus opened, the previously traced direct circuit for energizing the operating motor 16 is interrupted; and a normally completed shunt, including the control conductors 74 and 76, for short-circuiting the measuring coil R40 in interrupted; whereby the measuring coil R40 is inserted in series circuit relation with the operating motor 16. This series circuit for the operating motor and the measuring coil R40 extends from the control conductor 73 via the operating motor 16, the measuring coil R40, and the contacts Y in the set of switch springs S1 to the negative line conductor 71. Accordingly, the measuring coil R40 is now energized in series circuit relation with the operating motor 16 and meters the current drawn by the operating motor 16, which current is not excessive at this time, since the operating motor 16 has already had an opportunity to gain full speed and there is no washing liquid in the sump 15 in the vat 12. In passing it is noted that the measuring coil R40 is of the marginal type and is not operated to open the contacts 41 when light currents are drawn by the operating motor 16, as explained more fully hereinafter.

Also, in the set of switch springs S3, when the contacts 2 are closed, a circuit, including the contacts Y in the set of switch springs S1, the control conductors 74 and 79, the contacts 41, the control conductor 77, the contacts 1 in the set of switch springs S2, and the control conductor 73, is completed for energizing the inlet valve solenoid 18'. This circuit for energizing the inlet valve solenoid 18' includes the closed contacts 41 of the measuring coil R40, as previously noted. When the inlet valve solenoid 18' is thus energized the inlet valve 18 is operated to its open position, as previously explained; whereby washing liquid is supplied from the inlet conduit 17 to the spraying device 20. The washing liquid sprays downwardly from the spraying device 20 through the dishes supported by the rack structure, not shown, and accumulates in the sump 15. This washing liquid drains from the sump 15 through the drain valve 22 and thence into the drain conduit 25. Some of the washing liquid in the sump 15 may be caught and flung upwardly and outwardly through the dishes supported by the rack structure, not shown, by the blades of the impeller 14, although this action is not considerable at this time since the drain valve 22 occupies its draining position. Accordingly, the dishes supported by the rack structure, not shown, in the vat 12 are subjected to a first spray step that is carried out through a time interval of approximately 30 seconds.

At the conclusion of this first spray step the upper spring in the set of switch springs S4 engages the low portion of the cam C4 closing the associated contacts and completing a circuit, including the Y contacts of the set of switch springs S1, the control conductors 74, 78 and 77, the contacts 1 of the set of switch springs S2 and the control conductor 73, for energizing the drain valve solenoid 22'. When the drain valve solenoid 22' is thus energized the drain valve 22 is operated to its non-draining position; whereby the washing liquid accumulating in the sump 15 is retained therein after the adjacent section of the flexible conduit 23 is first filled with the washing liquid. At this time the inlet valve 18 still occupies its open position and the operating motor 16 is running. Accordingly, the washing liquid sprayed through the rack structure, not shown, from the spraying device 20 accumulates in the sump 15 since the drain valve 22 occupies its non-draining position. The washing liquid accumulating in the sump 15 of the vat 12 is caught by the blades of the impeller 14 and is flung upwardly and outwardly through the rack structure, not shown, and the dishes supported thereby against the walls of the vat 12 and the door 13 and again returns to the sump 15. The washing liquid as it is flung upwardly and outwardly has a generally rotary motion in the counterclockwise direction as viewed from the top of the vat 12 since the impeller 14 is rotated in this direction, as previously noted.

The supply of washing liquid from the spraying device 20 continues and as the quantity of washing liquid accumulating in the sump 15 increases, the load imposed upon the impeller 14 and consequently upon the operating motor 16 is gradually increased; whereby the current traversing the operating motor 16 and the measuring coil R40 is gradually increased. When a predetermined quantity of washing liquid accumulates in the sump 15, a corresponding predetermined load is imposed upon the operating motor 16, whereby the current traversing the operating motor 16 and the measuring coil R40 reaches a predetermined value. When this current traversing the measuring coil R40 reaches the predetermined value mentioned indicating that the vat 12 now contains a full and predetermined quantity of washing liquid, the measuring coil R40 effects opening of the contacts 41, since the measuring coil R40 is of the marginal type, as previously noted. When the contacts 41 are thus opened, the circuit for energizing the inlet valve solenoid 18' is interrupted; whereby the inlet valve 18 is slowly returned to its closed position under the control of the associated dashpot. Shortly thereafter, the inlet valve 18 is completely closed cutting off the supply of washing liquid from the inlet conduit 17 to the spraying device 20.

Approximately 45 seconds after the drain valve 22 is operated to its non-draining position, the intermediate spring of the set of switch springs S3 engages the low portion of the cam C3 opening the contacts 2 and reclosing the contacts 1. When the contacts 2 of the set of switch springs S3 are thus opened, a further point in the circuit for energizing the inlet valve solenoid 18' is interrupted; and when the contacts 1 of the set of switch springs S3 are thus closed, the path for short-circuiting the measuring coil R40 is again completed, together with the direct circuit for operating the operating motor 16. Accordingly, the measuring coil R40 is de-energized bringing about reclosure of the contacts 41; however, without effect at this time since the contacts 2 of the set of switch springs S3 are open. Thus the connections above-described provide a timed arrangement for effecting the de-energization of the inlet valve solenoid 18' and the consequent return of the inlet valve 18 to its closed position in the event this result has not already been brought about by operation of the measuring coil R40 within the 45 seconds period mentioned.

The first washing step continues for a total time of approximately 330 seconds following the operation of the drain valve 22 to its non-draining position, and within this time interval and in response to the accumulation of a predetermined quantity of washing liquid in the sump 15, the charge of detergent contained in the detergent cup 29 is introduced into the washing liquid in order that the first washing step may be effective to remove grease and other foreign materials from the dishes supported by the rack structure, not shown. The arrangement for introducing the detergent is disclosed in the copending application of Forrest A. Walker, Serial No. 57,448, filed October 30, 1948, and is based upon the accumulation of a predetermined quantity of washing liquid in the sump 15, whereby the washing liquid accumulating in the sump 15 is flushed or washed into the detergent cup 29 carried by the inner wall of the door 13 causing the detergent to be washed into the body of washing liquid contained in the vat 12. This introduction of the detergent into the washing liquid is accomplished shortly following the operation of the drain valve 22 to its non-draining position so that the detergent is present in the washing liquid during a substantial part of the time interval of the first washing step.

At the conclusion of the first washing step the upper spring of the set of switch springs S4 engages the high portion of the cam C4 opening the associated contacts and interrupting the circuit for energizing the drain valve solenoid 22'; whereby the drain valve 22 is returned to its draining position. At this time washing liquid and the carried detergent drain from the sump 15 into the drain conduit 25. The washing liquid contained in the sump 15 is drained in a very short interval of time; and approximately 45 seconds after the drain valve 22 is operated to its draining position the intermediate spring of the set of switch springs S3 engages the high portion of the cam C3 again opening the contacts 1 and reclosing the contacts 2. When the contacts 1 are thus again opened the measuring coil R40 is again inserted in series with the operating motor 16; and when the contacts 2 are reclosed the inlet valve solenoid 18' is again energized; all in the manner previously explained. At this time the inlet valve 18 is operated to its open position effecting the supply of washing liquid from the liquid supply conduit 17 to the spraying device 20; whereby the dishes supported by the rack structure, not shown, are again sprayed and the washing liquid accumulating in the sump 15 drains through the drain valve 22 in its draining position and thence into the drain conduit 25. This second spray step is carried out for a time interval of approximately 10 seconds; whereupon the upper spring of the set of switch springs S4 engages the lower portion of the cam C4 reclosing the associated contacts and effecting re-energization of the drain valve solenoid 22'. The drain valve 22 is again operated to its non-draining position causing the washing liquid to be retained in the sump 15, initiating a second washing step.

The second washing step proceeds in the manner of the first washing step described above; whereby the inlet valve 18 is subsequently operated to its closed position under the control of the measuring coil R40 dependent upon the load upon the operating motor 16, or under the control of the cam C3 and the associated set of switch springs S3; all in the manner previously explained. In any case, after a time interval of approximately 45 seconds following operation of the drain valve 22 to its non-draining position the intermediate spring of the set of switch springs S3 engages the low portion of the cam C3 opening the contacts 2 and closing the contacts 1 in order positively to insure de-energization of the inlet valve solenoid 18' and short-circuiting of the measuring coil R40. At this time the inlet valve 18 occupies its closed position and the drain valve 22 occupies its non-draining position; whereby the second washing step continues in the manner previously explained. The second washing step continues for a time interval of approximately 330 seconds following operation of the drain valve 22 to its non-draining position; whereupon, the upper spring of the set of switch springs S4 engages the high portion of the cam C4 opening the associated contacts and effecting de-energization of the drain valve solenoid 22' and the consequent operation of the drain valve 22 into its draining position.

The washing liquid accumulated in the sump 15 is drained into the drain conduit 25 in the manner previously explained in a very short time interval; and approximately 45 seconds after the drain valve 22 is operated into its draining position the intermediate spring of the set of switch springs S3 engages the high portion of the cam C3 again opening the contacts 1 and reclosing the contacts 2. Opening of the contacts 1 effects reinsertion of the measuring coil R40 in series with the operating motor 16; and reclosure of the contacts 2 effects re-energization of the inlet valve solenoid 18'. The inlet valve 18 is again operated to its open position in order to initiate a third spray step. The washing liquid supplied from the liquid supply conduit 17 to the spraying device 20 is sprayed through the dishes supported by the rack structure, not shown, and is drained from the sump 15 into the drain conduit 25. This third spray step continues through a time interval of 10 seconds following operation of the inlet valve 18 to its open position; whereupon, the upper spring of the set of switch springs S4 reengages the low portion of the cam C4 reclosing the associated contacts and the circuit for energizing the drain valve solenoid 22'. The drain valve 22 is operated to its non-draining position in order again to cause washing liquid to accumulate in the sump 15, initiating a first rinsing step.

The first rinsing step proceeds in a manner substantially identical to the first washing step described above; whereby the inlet valve 18 is subsequently operated to its closed position under the control of the measuring coil R40 dependent upon the load upon the operating motor 16, or under the control of the cam C3 and the associated set of switch springs S3; all in the manner previously explained. In any case, after a time interval of approximately 45 seconds following operation of the drain valve 22 to its non-draining position, the intermediate spring of the set of switch springs S3 engages the low portion of the control cam C3 effecting opening of the contacts 2 and closing of the contacts 1 in order positively to insure de-energization of the inlet valve solenoid 18' and short-circuiting of the measuring coil R40. At the time the inlet valve 18 occupies its closed position and the drain valve 22 occupies its non-draining position; whereby the first rinsing step continues for a time interval of approximately 90 seconds following the operation of the drain valve 22 to its non-draining position; whereupon, the upper spring of the set of switch springs S4 engages the high portion of the cam C4 opening the associated contacts and effecting de-energization of the drain valve solenoid 22' and the consequent return of the drain valve 22 to its draining position.

The washing liquid accumulated in the sump 15 is drained into the drain conduit 25 in the manner previously explained in a short time interval; and approximately 45 seconds after the drain valve 22 is operated into its draining position, the intermediate spring of the set of switch springs S3 engages the high portion of the cam C3 opening the contacts 1 and closing the contacts 2 in order to effect insertion of the measuring coil R40 in series with the operating motor 16 and energization of the inlet valve solenoid 18'. The inlet valve 18 is again operated to its open position in order to initiate a fourth spray step. The washing liquid supplied from the liquid supply pipe 17 to the spraying device 20 is sprayed through the dishes supported by the rack structure, not shown, and is drained from the sump 15 to the drain conduit 25. This fourth spray continues through a time interval of approximately 10 seconds following operation of the inlet valve 18 to its open position; whereupon the upper spring of the set of switch springs S4 engages the low portion of the cam C4 closing the associated contacts and effecting energization of the drain valve solenoid 22'. The drain valve 22 is operated to its non-draining position in order again to cause washing liquid to accumulate in the sump 15, initiating a second rinsing step.

The second rinsing step proceeds in a manner identical to the first rinsing step described above; whereby the inlet valve 18 is subsequently operated to its closed position under the control of the measuring coil R40 dependent upon the load upon the operating motor 16, or under the control of the cam C3 and the associated set of switch springs S3; all in the manner previously explained. In any case, after a time interval of approximately 45 seconds following operation of the drain valve 22 into its non-draining position, the intermediate spring of the set of switch springs S3 engages the low portion of the cam C3 opening the contacts 2 and closing the contacts I in order positively to insure de-energization of the inlet valve solenoid 18' and short-circuiting of the measuring coil R40. At this time the inlet valve 18 occupies its closed position and the drain valve 22 occupies its non-draining position; whereby the second rinsing step continues for a time interval of approximately 90 seconds following operation of the drain valve 22 to its non-draining position; whereupon the upper spring of the set of switch springs S4 engages the high portion of the cam C4 opening the associated contacts in order to effect de-energization of the drain valve solenoid 22' and the consequent return of the drain valve 22 to its draining position.

The washing liquid accumulated in the sump 15 is drained into the drain conduit 25 in the manner previously explained in a short time interval; and approximately 45 seconds after the drain valve 22 is operated to its draining position the intermediate spring of the set of switch springs S2 engages the highest portion of the cam C2 opening the contacts I and closing the contacts 2. When the contacts I of the set of switch springs S2 are thus opened the common point in the circuit for energizing the inlet valve solenoid 18' and the drain valve solenoid 22' is interrupted, thereby positively to insure that the inlet valve 18 occupies its closed position and the drain valve 22 occupies its draining position in the remainder of the washing cycle. In other words, the operation of the set of switch springs S2 to open the contacts I positively disables further effective control of the sets of switch springs S3 and S4 notwithstanding further operation thereof by the respective cams C3 and C4. In the set of switch springs S2, closure of the contacts 2 completes a circuit for energizing the heating element 26 that includes the control conductors 73, 76' and 75 and the X contacts of the set of switch springs S1; whereby heat produced by the heating element 26 in the vat 12 is circulated in the vat 12 by the blades of the impeller 14 since operation of the operating motor 16 is continued at this time. The hot air circulated in the vat 12 by the impeller 14 is directed into contact with and through the dishes supported by the rack structure, not shown, and thence back into contact with the heating element 26.

This initial drying step is continued for a time interval of approximately 1200 seconds; whereupon the lowermost spring of the set of switch springs S1 engages the intermediate portion of the cam C1 effecting opening of the contacts Y while the contacts X are retained closed. Opening of the contacts Y of the set of switch springs S1 interrupts the circuit for operating the operating motor 16; while the closed contacts X of the set of switch springs S1 retains completed the circuit for energizing the heating element 26. Accordingly, the operating motor 16 stops, arresting the rotation of the impeller 14, while the supply of heat to the heating element 26 continues. Thus drying of the dishes supported by the rack structure, not shown, continues through a final drying step after operation of the impeller 14 has been arrested. The final drying step continues for a time interval of approximately 600 seconds; whereupon the lowermost spring of the set of switch springs S1 engages the lowest portion of the cam C1 opening the contacts X; and the intermediate spring of the set of switch springs S2 engages the intermediate portion of the cam C2 opening the contacts 2. Opening of the contacts X of the set of switch springs S1 interrupts the circuit for energizing the heating element 26 and interrupts the operating circuit for the timer motor 66. Also, opening of the contacts 2 of the set of switch springs S2 interrupts a further point in the circuit for energizing the heating element 26, whereby both terminals of the heating element 26 are disconnected at this time from the line conductors 71 and 72 of the source of current supply.

At this time the shaft 54 of the circuit controller 30 has been rotated from its "on" position in the clockwise direction back into its "off" position; operation of the circuit controller 30 has been arrested; and the washing cycle of the dishwashing apparatus 10 has been completed. Thus it will be understood that when the manual control knob 55 of the circuit controller 30 is rotated from its "off" position, slightly greater than 60 degrees in the clockwise direction into its "on" position, further operation of the circuit controller 30 is automatically initiated under the control of the timer motor 66. More particularly, the timer motor 66 effects continued rotation of the manual control knob 55 in the clockwise direction from its "on" position back into its "off" position, whereby operation of the circuit controller 30 is automatically arrested. As the shaft 54 is rotated from its "on" position back into its "off" position in the clockwise direction, it is rotated sequentially through the different control positions thereof causing the cams C1 and C2 to effect the operations of the sets of switch springs S1 and S2, respectively, as described above. Also, the shaft 60 is rotated in the counterclockwise direction causing the cams C3 and C4 to effect the sequential operations of the sets of switch springs S3 and S4, respectively, as described above.

Since the shaft 60 is rotated three revolutions in the counterclockwise direction while the shaft 54 is rotated only one revolution in the clockwise direction, noncontrolling operations by the cams C3 and C4 of the sets of switch springs S3 and S4, respectively, are effected at the beginning and at the end of the washing cycle; however, without effect; since the actual control exerted by the sets of switch springs S3 and S4 is negated by the set of switch springs S2 except during one revolution of the shaft 60 in the intermediate portion of the washing cycle. More particularly, the sets of switch springs S3 and S4 are rendered operative to effect controls only when the set of switch springs S2 is operated to close the contacts I; which circumstance is present in the cycle only during rotation of the shaft 54 through the segment of its revolution between 60 and 180 degrees thereof from its "off" position. This rotation of the shaft 54 through 120 degrees corresponds to a complete rotation of the shaft 60 through 360 degrees, as clearly indicated in Fig. 4. Following this rotation of the shafts 60 and 54 and when the shaft 54 reaches its 180 degree position, the cam C2 operates the set of switch springs S2 in order to open the contacts 1, thereby again negating operation of the sets of switch springs S3 and S4.

This arrangement is very advantageous as it permits utilization of the complete 360 degrees of periphery of the cams C3 and C4 to effect the operations of the sets of switch springs S3 and S4, respectively, during the corresponding 120 degrees of rotation of the cams C1 and C2. Thus the arrangement permits the desired fine and accurate controls of the inlet valve solenoid 18' and the drain valve solenoid 22' repeatedly in the intermediate 1170 seconds within the washing cycle where these controls are required. Thus the cams C1 to C4, inclusive, effect coordinate operations of the sets of switch springs S1 to S4, inclusive, in order to effect the automatic washing cycle of the dishwashing apparatus 10 through the various spraying, washing, rinsing and drying steps as explained above.

As previously explained, the friction clutch 62 interposed between the shafts 60 and 61 permits rotation of the shaft 60 in either direction by the manual control knob 55 with respect to the stub shaft 61 at any time and independently of the timer motor 66 so that any one or more of the steps in the above-described washing cycle may be selectively omitted or repeated by appropriate manual rotation of the manual control knob 55 in the proper direction. For example, the final drying step may be omitted from the above-described washing cycle by rotating the manual control knob 55 in the clockwise direction back into its "off" position when the cam C2 first operates the set of switch springs S2 to close the contacts 2, thereby reducing the length of the washing cycle by approximately 30 minutes. This facility is especially useful when it is desired to wash a number of loads of dishes and automatic drying thereof is not important to the operator, or hand-drying thereof is particularly wished by the operator.

During the operation of the dishwashing apparatus 10 in the timed washing cycle above described, the door 13 must be retained in its closed position as previously explained in order to retain the door switch S41 in its closed position, as it will be observed that the door switch S41 occupies an interlock position in the control network, and that any time the door 13 is operated to its open position, the door switch S41 is operated to its open position arresting all operations of the dishwashing apparatus 10. Finally at the conclusion of the timed washing cycle the dishes supported by the rack structure, not shown, have not only been thoroughly washed and rinsed, but they have also been dried. Subsequently, the door 13 may be moved from its closed position into its open position and the rack structure, not shown, may be moved out of the vat 12 over the door 13 in its open position so that the dishes may be removed from the rack structure and placed in a kitchen cabinet, or the like, if desired.

In view of the foregoing it is apparent there has been provided in dishwashing apparatus an improved cycle control circuit obtaining an improved cycle of operation of the electro-responsive elements thereof that permits flexibility of operation and achieves accurate and positive response. While the circuit controller of improved construction and arrangement has been disclosed in the cyclic control circuit of the dishwashing apparatus, it will be understood that it is generally useful in other program selecting systems, such, for example, as in clothes washing apparatus, or in other apparatus requiring a prescribed program or cycle of predetermined operations.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A program selecting system comprising first and second rotatable shafts, speed-change gearing interconnecting said shafts so that when either one of said shafts is rotated at one speed the other of said shafts is driven at another speed, said first shaft having an off position and an on position and a plurality of control positions and being rotatable sequentially from its off position into its on position and thence through its control positions back into its off position, a manually rotatable member connected to said first shaft for rotating it, an electro-responsive timer operative at a predetermined rate, a drive connection between said timer and said second shaft for rotating it, said drive connection accommodating rotation of said second shaft by said first shaft through said gearing independently of said timer, a source of current supply, switching contacts, an operating circuit for said timer including said source and said switching contacts, means responsive to rotation of said first shaft by said manually rotatable member from its off position into its on position for closing said switching contacts in order to complete said operating circuit so as to initiate operation of said timer, said timer rotating said first shaft through said drive connection and said second shaft and said gearing from its on position through its control positions back into its off position, means responsive to rotation of said first shaft back into its off position for opening said switching contacts in order to interrupt said operating circuit so as to arrest operation of said timer, said second shaft having a plurality of control positions and being rotatable sequentially therethrough, a first control circuit selectively governed by said first shaft in its various control positions, and a second control circuit selectively governed jointly by said first shaft in a predetermined one of its control positions and by said second shaft in its various control positions.

2. A program selecting system comprising first and second rotatable shafts, speed-change gearing interconnecting said shafts so that when said first shaft is rotated one revolution said second shaft is driven N revolutions and so that when said second shaft is rotated one revolution said first shaft is driven 1/N revolution, where N is an integer greater than 1, said first shaft having an off position and an on position and a plurality of control positions and being rotatable sequentially from its off position into its on position and then through its control positions back into its off position, a manually rotatable member connected to said first shaft for rotating it, an electro-responsive timer operative at a predetermined rate, a drive connection between said timer and said second shaft for rotating it, said drive connection accommodating rotation of said second shaft by said first shaft through said gearing independently of said timer, a source of current supply, switching contacts, an operating circuit for said timer including said source and said switching contacts, means responsive to rotation of said first shaft by said manually rotatable member from its off position into its on position for closing said switching contacts in order to complete said operating circuit so as to initiate operation of said timer, said timer rotating said first shaft through said drive connection and said second shaft and said gearing from its on position through its control positions back into its off position, means responsive to rotation of said first shaft back into its off position for opening said switching contacts in order to interrupt said operating circuit so as to arrest operation of said timer, said second shaft having a plurality of control positions and being rotatable sequentially therethrough, a first control circuit selectively governed by said first shaft in its various control positions, a circuit controller selectively governed by said second shaft in its various control positions, and a second control circuit selectively governed jointly by said first shaft in a predetermined segment of substantially 1/N length of rotation thereof and by said circuit controller.

3. A program selecting system comprising first and second rotatable shafts, speed-change gearing interconnecting said shafts so that when said first shaft is rotated one revolution said second shaft is driven N revolutions and so that when said second shaft is rotated one revolution said first shaft is driven 1/N revolution, where N is an integer greater than 1, said first shaft having an off position and an on position and a plurality of control positions and being rotatable sequentially from its off position into its on position and thence through its control positions back into its off position, a manually rotatable member connected to said first shaft for rotating it, an electro-responsive timer operative at a predetermined rate, a drive connection between said timer and said second shaft for rotating it, said drive connection accommodating rotation of said second shaft by said first shaft through said gearing independently of said timer, a source of current supply, switching contacts, an operating circuit for said timer including said source and said switching contacts, means responsive to rotation of said first shaft by said manually rotatable member from its off position into its on position for closing said switching contacts in order to complete said operating circuit so as to initiate operation of said timer, said timer rotating said first shaft through said drive connection and said second shaft and said gearing from its on position through its control positions back into its off position, means responsive to rotation of said first shaft back into its off position for opening said switching contacts in order to interrupt said operating circuit so as to arrest operation of said timer, said second shaft having a plurality of control positions and being rotatable sequentially therethrough, a first control circuit selectively governed by said first shaft in its various control positions, a first pair of switch springs selectively operated between opened and closed positions by said first shaft in its various control positions, said first pair of switch springs occupying a given position only in a predetermined segment of substantially 1/N length of rotation of said first shaft, a second pair of switch springs selectively operated between opened and closed positions by said second shaft in its various control positions, and a second control circuit selectively governed jointly by said first and second pairs of switch springs.

4. A program selecting switch comprising a frame, first and second rotatable shafts mounted on said frame, speed-change gearing interconnecting said shafts so that when said first shaft is rotated one revolution said second shaft is driven N revolutions and so that when said second shaft is rotated one revolution said first shaft is driven 1/N revolution, where N is an integer greater than 1, a manually rotatable member connected to said first shaft for rotating it, an electro-responsive timer operative at a predetermined rate, a drive connection between said timer and said second shaft for rotating it, said drive connection accommodating rotation of said second shaft by said first shaft through said gearing independently of said timer, said timer being operative to rotate said first shaft through said drive connection and said second shaft and said gearing independently of said manually rotatable member, first switching mechanism selectively governed by rotation of said first shaft for controlling operation of said timer, normally ineffective second switching mechanism selectively governed by rotation of said second shaft, and third switching mechanism selectively governed by rotation of said first shaft for selectively rendering effective said second switching mechanism.

5. A program selecting switch comprising a frame, first and second rotatable shafts mounted on said frame, speed-change gearing interconnecting said shafts so that when said first shaft is rotated one revolution said second shaft is driven N revolutions and so that when said second shaft is rotated one revolution said first shaft is driven 1/N revolution, where N is an integer greater than 1, a manually rotatable member connected to said first shaft for rotating it, an electro-responsive timer operative at a predetermined rate, a drive connection between said timer and said second shaft for rotating it, said drive connection accommodating rotation of said second shaft by said first shaft through said gearing independently of said timer, said timer being operative to rotate said first shaft through said drive connection and said second shaft and said gearing independently of said manually rotatable member, first switching mechanism selectively governed by rotation of said first shaft for controlling operation of said timer, normally ineffective second switching mechanism selectively governed by rotation of said second shaft, and third switching mechanism selectively governed by rotation of said first shaft through a predetermined segment of substantially 1/N length of rotation thereof for selectively rendering effective said second switching mechanism.

6. A program selecting switch comprising a frame, first and second and third rotatable shafts mounted on said frame, speed-change gearing interconnecting said first and second shafts so that when said first shaft is rotated one revolution said second shaft is driven more than one revolution and so that when said second shaft is rotated one revolution said first shaft is driven less than one revolution, a manually rotatable member connected to said first shaft for rotating it, an electro-responsive timer connected to said third shaft for rotating it at a predetermined speed, a friction clutch interconnecting said second and third shafts, said third shaft when rotated by said timer driving said second shaft through said friction clutch, said friction clutch accommodating slipping of said second shaft with respect to said third shaft when said second shaft is rotated by said first shaft through said gearing, switching mechanism selectively governed by rotation of said first shaft for controlling operation of said timer, and additional switching mechanism selectively governed jointly by rotation of both of said first and second shafts.

DOUGLAS F. ILLIAN.

References Cited in the file of this patent

UNITED STATES PATENTS

| Number | Name | Date |
|---|---|---|
| 1,820,252 | Shippy | Aug. 25, 1931 |
| 2,230,191 | Knight | Jan. 28, 1941 |
| 2,295,057 | Schumert | Sept. 8, 1942 |
| 2,469,341 | Pearson | May 3, 1949 |
| 2,471,426 | Grant | May 31, 1949 |
| 2,502,823 | Clark | Apr. 4, 1950 |
| 2,540,723 | Geldhof et al. | Feb. 6, 1951 |
| 2,561,119 | Horvath | July 17, 1951 |
| 2,561,348 | Dunham | July 24, 1951 |
| 2,563,738 | Oliver | Aug. 7, 1951 |
| 2,579,598 | Morrison | Dec. 25, 1951 |